(12) United States Patent
Miyazaki et al.

(10) Patent No.: US 10,647,889 B2
(45) Date of Patent: May 12, 2020

(54) ADHESIVE COMPOSITION

(71) Applicant: DENKA COMPANY LIMITED, Tokyo (JP)

(72) Inventors: Hayato Miyazaki, Shibukawa (JP); Kenji Fukao, Shibukawa (JP); Hiroki Uno, Shibukawa (JP); Yoshitsugu Goto, Shibukawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 210 days.

(21) Appl. No.: 15/748,071

(22) PCT Filed: Jul. 28, 2016

(86) PCT No.: PCT/JP2016/072175
§ 371 (c)(1),
(2) Date: Jan. 26, 2018

(87) PCT Pub. No.: WO2017/018486
PCT Pub. Date: Feb. 2, 2017

(65) Prior Publication Data
US 2018/0215954 A1    Aug. 2, 2018

(30) Foreign Application Priority Data

Jul. 30, 2015 (JP) .................... 2015-150268
Jul. 30, 2015 (JP) .................... 2015-150269

(51) Int. Cl.

| | |
|---|---|
| C09J 4/06 | (2006.01) |
| C08F 2/44 | (2006.01) |
| C09J 109/02 | (2006.01) |
| C09J 11/00 | (2006.01) |
| C09J 157/04 | (2006.01) |
| C09J 133/06 | (2006.01) |
| C08F 279/02 | (2006.01) |
| C08F 290/04 | (2006.01) |
| C09J 5/00 | (2006.01) |

(52) U.S. Cl.
CPC .............. C09J 4/06 (2013.01); C08F 2/44 (2013.01); C08F 279/02 (2013.01); C08F 290/048 (2013.01); C09J 5/00 (2013.01); C09J 11/00 (2013.01); C09J 109/02 (2013.01); C09J 133/066 (2013.01); C09J 157/04 (2013.01); *C09J 2451/00* (2013.01)

(58) Field of Classification Search
CPC ...... C09J 133/066; C09J 109/02; C09J 11/00; C09J 157/04; C09J 2451/00; C09J 4/06; C09J 5/00; C08L 2205/03; C08L 9/02; C08L 15/00; C08L 33/18; C08F 279/02; C08F 290/048; C08F 2/44
See application file for complete search history.

(56) References Cited

U.S. PATENT DOCUMENTS

| | | | |
|---|---|---|---|
| 5,863,989 A | 1/1999 | Taguchi et al. | ............... 525/245 |
| 2002/0193487 A1 | 12/2002 | Sakurai et al. | ............... 524/417 |
| 2010/0236716 A1 | 9/2010 | Hisha et al. | ............... 156/331.6 |
| 2012/0070660 A1* | 3/2012 | Miyazaki | ............... C09J 133/08 |
| | | | 428/355 AC |

FOREIGN PATENT DOCUMENTS

| | | |
|---|---|---|
| JP | H 10-7753 A | 1/1998 |
| JP | H 11-147921 A | 6/1999 |
| JP | 2001-55420 A | 2/2001 |
| JP | 2001-55422 A | 2/2001 |
| JP | 2001-55423 A | 2/2001 |
| JP | 2002-265509 A | 9/2002 |
| JP | 2002-308944 A | 10/2002 |
| JP | 2011-89055 A | 5/2011 |
| WO | WO 2009/041248 A1 | 4/2009 |
| WO | WO 2011/102341 A1 | 8/2011 |
| WO | WO 2012/161221 A1 | 11/2012 |
| WO | WO 2013/021945 A1 | 2/2013 |

OTHER PUBLICATIONS

Machine translation of WO 2013/021945, Nakajima et al, Feb. 14, 2013 (Year: 2013).*
NBR, retrieved from www.rubberstation.com/HTML13.htm on Dec. 3, 2019.*
International Search Report dated Sep. 6, 2016, issued to International Application No. PCT/JP2016/072175.

* cited by examiner

*Primary Examiner* — Frances Tischler
(74) *Attorney, Agent, or Firm* — Stein IP, LLC

(57) ABSTRACT

A two-component (meth) acrylic adhesive excellent in peel strength at low temperature and impact resistance is provided. A composition comprising components of (1) to (4): (1) a polymerizable vinyl monomer comprising (1-1) to (1-4); (2) a polymerization initiator; (3) a reducing agent; and (4) an elastomer having no polymerizable unsaturated double bond at the end and having 10 to 30 mol % of a (meth) acrylonitrile. A composition comprising components of (1) to (4): (1) a polymerizable vinyl monomer comprising (1-1) to (1-4); (2) a polymerization initiator; (3) a reducing agent; (4) an elastomer having a polymerizable unsaturated double bond at the end and having 10 to 30 mol % of a (meth) acrylonitrile; and (5) an elastomer having no polymerizable unsaturated double bond at the end.

11 Claims, No Drawings

ADHESIVE COMPOSITION

CROSS-REFERENCE TO RELATED APPLICATIONS

This application is a national stage of International Application No. PCT/JP2016/072175, filed Jul. 28, 2016, which claims the benefit of priority to Japanese Application No. 2015-150268, filed Jul. 30, 2015, and Japanese Application No. 2015-150269, filed Jul. 30, 2015 in the Japanese Patent Office, the disclosures of which are incorporated herein in their entireties by reference.

TECHNICAL FIELD

The present invention relates to a (meth) acrylic adhesive composition excellent in adhesion strength even at low temperatures.

BACKGROUND

In view of labor saving, resource saving and energy saving, a room-temperature rapid-curing adhesive composition is used as adhesives for bonding at room temperature and in a short time. Conventionally, as a room-temperature rapid-curing adhesive composition, a two-component rapid-curing epoxy adhesive composition, an anaerobic adhesive composition, an instantaneous adhesive composition and a second-generation acrylic adhesive composition (SGA) have been known.

The two-component rapid-curing epoxy adhesive is used by measuring and mixing a main agent and a curing agent, coating the mixture of the main agent and the curing agent on an adherend, and cures by a reaction of the main agent and the curing agent. However, the two-component rapid-curing epoxy adhesive is required to have higher peel strength and impact strength.

The anaerobic adhesive cures by pressuring the adhesive composition between adherends and blocking air. However, the anaerobic adhesive composition is required to cure even if a part of the adhesive composition contacts with air when a part of the adhesive composition protruded from the adherends during pressuring. Also, it is required that the adhesive composition cures even when a clearance between adherends is large.

The instantaneous adhesive usually contains a cyanoacrylate as a main component and is excellent in workability. However, higher peel strength and impact strength are required.

Although SGA is a two-component acrylic adhesive, it does not require precise measuring of two agents. Even if measuring or mixing is incomplete, the adhesive cures at room temperature for several minutes to several tens of minutes by just contacting two agents. It is used in a wide range of fields from the electric/electronic parts field to the civil engineering and construction field, since it has excellent workability, high peeling strength and impact strength, and good curing characteristics of the protruded part. Recently, SGA having less odor has been developed, and it can work even in places having only inadequate ventilation equipment.

Among various required characteristics, a characteristic under a low temperature environment is required, the adhesive cured product is also exposed to an environment below freezing point.

Under low temperature conditions, the adhesive cured product may become fragile, the adhesive strength may lower, and peeling may occur.

CITATION LIST

Patent Literature

[Patent Literature 1] JPH11-147921
[Patent Literature 2] JP2001-55423

SUMMARY OF INVENTION

Technical Problem

A method for improving the peel strength at low temperature with a liquid elastomer is disclosed in Patent Literature 1. However, Patent Literature 1 does not disclose that a composition with low odor and low volatility can be obtained by containing no methyl methacrylate. A composition having low odor and low volatility is disclosed in Patent Document 2. However, there is no description about (meth) acrylonitrile content.

An object of the present invention is, for example, to provide a two-component (meth) acrylic adhesive excellent in peel strength at low temperature and low odor.

Solution to Problem

The inventors have found that when a composition comprising a polymerizable vinyl monomer having a specific composition, a polymerization initiator, a reducing agent, and an elastomer having a (meth) acrylonitrile content within a specific range is used, a two-component (meth) acrylic adhesive having excellent peel strength at low temperature and low odor can be provided.

The present invention is as follows.

A composition comprising components of (1) to (4): (1) a polymerizable vinyl monomer comprising (1-1) to (1-4); (2) a polymerization initiator; (3) a reducing agent; and (4) an elastomer having no polymerizable unsaturated double bond at the end and having 10 to 30 mol % of a (meth) acrylonitrile, wherein (1-1) a compound represented by a General formula (A);

[General Formula (A)]

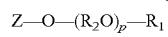

(In the formula (A), Z represents a (meth) acryloyl group, and $R_1$ represents a phenyl group or a phenyl group having an alkyl group having 1 to 3 carbon atoms. $R_2$ represents —$C_2H_4$—, —$C_3H_6$—, —$CH_2CH(CH_3)$—, —$C_4H_8$— or $C_6H_{12}$—, and p represents an integer of 1 to 10.)

(1-2) a compound represented by a General Formula (B);

[General Formula (B)]

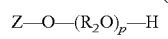

(In the formula (B), Z, $R_2$ and p are as defined above.)

(1-3) a compound represented by a General Formula (C); and

[General Formula (C)]

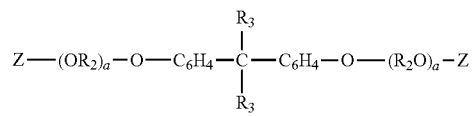

(In the formula (C), Z represents a (meth) acryloyl group, and $R_2$ represents $-C_2H_4-$, $-C_3H_6-$, $-CH_2CH(CH_3)-$, $-C_4H_8-$ or $-C_6H_{12}-$. $R_3$ represents hydrogen or an alkyl group having 1 to 4 carbon atoms, and q represents a number of 0 or more.)

(1-4) a compound represented by a General Formula (D)

[General Formula (D)]

Z—O—$R_4$ (In the formula (D), Z represents a (meth) acryloyl group, and $R_4$ represents an alkyl group having 3 to 16 carbon atoms.).

Preferably, the elastomer having no polymerizable unsaturated double bond at the end and having 10 to 30 mol % of a (meth) acrylonitrile of (4) is a diene copolymer.

Preferably, the composition is a two-component composition comprising a first agent and a second agent, the first agent comprises at least the polymerization initiator of (2) and the second agent comprises at least the reducing agent of (3).

A curable resin composition comprising the composition.

A joined body which adherends are bonded with the adhesive composition.

A method for bonding adherends with the adhesive composition.

According to another viewpoint, the present invention is as follows.

A composition comprising components of (1) to (4): (1) a polymerizable vinyl monomer comprising (1-1) to (1-4); (2) a polymerization initiator; (3) a reducing agent; (4) an elastomer having a polymerizable unsaturated double bond at the end and having 10 to 30 mol % of a (meth) acrylonitrile; and (5) an elastomer having no polymerizable unsaturated double bond at the end, wherein (1-1) a compound represented by a General formula (A);

[General Formula (A)]

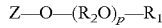

Z—O—$(R_2O)_p$—$R_1$ (In the formula (A), Z represents a (meth) acryloyl group, and $R_1$ represents a phenyl group or a phenyl group having an alkyl group having 1 to 3 carbon atoms. $R_2$ represents $-C_2H_4-$, $-C_3H_6-$, $-CH_2CH(CH_3)-$, $-C_4H_8-$ or $-C_6H_{12}-$, and p represents an integer of 1 to 10.)

(1-2) a compound represented by a General Formula (B);

[General Formula (B)]

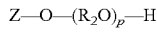

Z—O—$(R_2O)_p$—H (In the formula (B), Z, $R_2$ and p are as defined above.)

(1-3) a compound represented by a General Formula (C); and

[General Formula (C)]

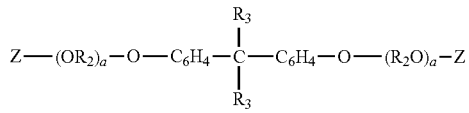

Z—$(OR_2)_a$—O—$C_6H_4$—C($R_3$)($R_3$)—$C_6H_4$—O—$(R_2O)_a$—Z (In the formula (C), Z represents a (meth) acryloyl group, and $R_2$ represents $-C_2H_4-$, $-C_3H_6-$, $-CH_2CH(CH_3)-$, $-C_4H_8-$ or $-C_6H_{12}-$. $R_3$ represents hydrogen or an alkyl group having 1 to 4 carbon atoms, and q represents a number of 0 or more.)

(1-4) a compound represented by a General Formula (D)

[General Formula (D)]

Z—O—$R_4$ (In the formula (D), Z represents a (meth) acryloyl group, and $R_4$ represents an alkyl group having 3 to 16 carbon atoms.).

Preferably, the elastomer of (5) has 10 to 30 mol % of a (meth) acrylonitrile.

Preferably, the elastomer (5) is a diene copolymer.

Preferably, the composition is a two-component composition comprising a first agent and a second agent, the first agent comprises at least the polymerization initiator of (2) and the second agent comprises at least the reducing agent of (3).

A curable resin composition comprising the composition.

A joined body which adherends are bonded with the adhesive composition.

A method for bonding adherends with the adhesive composition.

Advantageous Effects of Invention

The present invention can, for example, provide a two-component (meth) acrylic adhesive excellent in peel strength at low temperature and low odor

DESCRIPTION OF EMBODIMENTS

Hereinafter, the embodiments of the present invention will be explained in detail.

First Embodiment

In an embodiment of the present invention, a composition comprising components of (1) to (4) is provided: (1) a polymerizable vinyl monomer comprising (1-1) to (1-4); (2) a polymerization initiator; (3) a reducing agent; and (4) an elastomer having no polymerizable unsaturated double bond at the end and having 10 to 30 mol % of a (meth) acrylonitrile, wherein (1-1) a compound represented by a General formula (A);

[General Formula (A)]

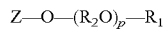

Z—O—$(R_2O)_p$—$R_1$ (In the formula (A), Z represents a (meth) acryloyl group, and $R_1$ represents a phenyl group or a phenyl group having an alkyl group having 1 to 3 carbon atoms. $R_2$ represents $-C_2H_4-$, $-C_3H_6-$, $-CH_2CH(CH_3)-$, $-C_4H_8-$ or $-C_6H_{12}-$, and p represents an integer of 1 to 10.)

(1-2) a compound represented by a General Formula (B);

[General Formula (B)]

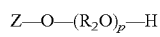

Z—O—$(R_2O)_p$—H (In the formula (B), Z, $R_2$ and p are as defined above.)

(1-3) a compound represented by a General Formula (C); and

[General Formula (C)]

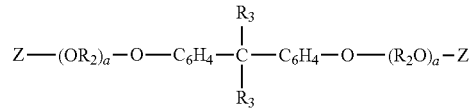

Z—$(OR_2)_a$—O—$C_6H_4$—C($R_3$)($R_3$)—$C_6H_4$—O—$(R_2O)_a$—Z (In the formula (C), Z represents a (meth) acryloyl group, and $R_2$ represents $-C_2H_4-$, $-C_3H_6-$, $-CH_2CH(CH_3)-$, $-C_4H_8-$ or $-C_6H_{12}-$. $R_3$ represents hydrogen or an alkyl group having 1 to 4 carbon atoms, and q represents a number of 0 or more.)

(1-4) a compound represented by a General Formula (D)

[General Formula (D)]

$$Z\text{—}O\text{—}R_4$$

(In the formula (D), Z represents a (meth) acryloyl group, and $R_4$ represents an alkyl group having 3 to 16 carbon atoms.).

In this embodiment, the composition of the polymerizable vinyl monomer of (1) comprises (1-1), (1-2), (1-3) and (1-4) as a polymerizable vinyl monomer. The polymerizable vinyl monomer may be any one that can be radically polymerized. Among them, the polymerizable vinyl monomer is more preferably a polymerizable (meth) acrylic acid derivative from the viewpoint of curing rate and the like. Preferably the polymerizable vinyl monomer of (1) comprises 70 parts by mass or more of a polymerizable (meth) acrylic acid derivative, more preferably all polymerizable vinyl monomers are polymerizable (meth) acrylic acid derivatives. Hereinafter, the term "100 parts by mass of the polymerizable vinyl monomer of (1)" refers to a total of 100 parts by mass of (1-1), (1-2), (1-3) and (1-4).

The compound of General Formula (A) of (1-1) used in this embodiment refers to the following structure.

[General Formula (A)]

$$Z\text{—}O\text{—}(R_2O)_p\text{—}R_1$$

(In the formula (A), Z represents a (meth) acryloyl group, and $R_1$ represents a phenyl group or a phenyl group having an alkyl group having 1 to 3 carbon atoms. $R_2$ represents —$C_2H_4$—, —$C_3H_6$—, —$CH_2CH(CH_3)$—, —$C_4H_8$— or —$C_6H_{12}$—, and p represents an integer of 1 to 10.)

Examples of the compound of the formula (A) of (1-1) include phenoxyethyl (meth) acrylate, phenoxydiethylene glycol (meth) acrylate, phenoxypolyethylene glycol (meth) acrylate, phenoxypropyl (meth) acrylate, phenoxydipropylene glycol (meth) acrylate, and phenoxy polypropylene glycol (meth) acrylate. Among them, phenoxyethyl (meth) acrylate is preferable in view of adhesiveness.

The polymerizable vinyl monomer of (1) comprises preferably 10 to 60 parts by mass, more preferably 20 to 50 parts by mass of the compound of General Formula (A) of (1-1) with respect to 100 parts by mass of the polymerizable vinyl monomer of (1). When the polymerizable vinyl monomer of (1) comprises less than 10 parts by mass of the compound of General Formula (A), the adhesiveness may deteriorate. When the polymerizable vinyl monomer of (1) comprises more than 60 parts by mass of the compound of General Formula (A), the adhesiveness may deteriorate.

The compound of General Formula (B) of (1-2) used in this embodiment refers to the following structure.

[General Formula (B)]

$$Z\text{—}O\text{—}(R_2O)_p\text{—}H$$

(In the formula (B), Z, $R_2$ and p are as defined above.)

Examples of the compound of the formula (A) of (1-1) include hydroxyalkyl (meth) acrylates such as 2-hydroxyethyl (meth) acrylate, 2-hydroxypropyl (meth) acrylate and 2-hydroxybutyl (meth) acrylate, diethylene glycol mono (meth) acrylate and polypropylene glycol (meth) acrylate. Among them, hydroxyalkyl (meth) acrylate is preferable in views of adhesiveness and moisture resistance. Among hydroxyalkyl (meth) acrylates, 2-hydroxyethyl (meth) acrylate and/or 2-hydroxypropyl (meth) acrylate are preferred, and 2-hydroxyethyl (meth) acrylate are more preferred.

The polymerizable vinyl monomer of (1) comprises preferably 10 to 70 parts by mass, more preferably 20 to 60 parts by mass of the compound of General Formula (B) of (1-2) with respect to 100 parts by mass of the polymerizable vinyl monomer of (1). When the polymerizable vinyl monomer of (1) comprises less than 10 parts by mass of the compound of General Formula (B), the adhesiveness may deteriorate. When the polymerizable vinyl monomer of (1) comprises more than 70 parts by mass of the compound of General Formula (B), the moisture resistance may deteriorate.

The compound of General Formula (C) of (1-3) used in this embodiment refers to the following structure.

[General Formula (C)]

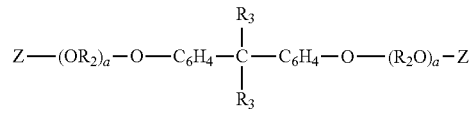

(In the formula (C), Z represents a (meth) acryloyl group, and $R_2$ represents —$C_2H_4$—, —$C_3H_6$—, —$CH_2CH(CH_3)$—, —$C_4H_8$— or —$C_6H_{12}$—. $R_3$ represents hydrogen or an alkyl group having 1 to 4 carbon atoms, and q represents a number of 0 or more.)

Examples of such (meth) acrylic monomers include 2,2-bis (4-(meth) acryloxyphenyl) propane, 2,2-bis (4-(meth) acryloxyethoxyphenyl) propane, 2,2-bis (4-(meth) acryloxydiethoxyphenyl) propane, 2,2-bis (4-(meth) acryloxypropoxyphenyl) propane, 2,2-bis (4-(meth) acryloxytetraethoxyphenyl) propane, 2,2-bis (4-(meth) acryloxypolyethoxyphenyl) propane. Among them, 2,2-bis (4-(meth) acryloxypolyethoxyphenyl) propane is preferable from the viewpoint of adhesiveness.

Also, q is a number of 0 or more, preferably 1 or more, more preferably 3 or more. q is preferably 15 or less, more preferably 10 or less, further preferably 8 or less. Most preferably, q is preferably 5.

The polymerizable vinyl monomer of (1) comprises preferably 1 to 30 parts by mass, more preferably 3 to 20 parts by mass of the compound of General Formula (C) of (1-3) with respect to 100 parts by mass of the polymerizable vinyl monomer of (1). When the polymerizable vinyl monomer of (1) comprises less than 1 parts by mass of the compound of General Formula (C), the adhesiveness may deteriorate. When the polymerizable vinyl monomer of (1) comprises more than 30 parts by mass of the compound of General Formula (C), the moisture resistance may deteriorate.

The compound of General Formula (D) of (1-4) used in this embodiment refers to the following structure.

[General Formula (D)]

$$Z\text{—}O\text{—}R_4$$

(In the formula (D), Z represents a (meth) acryloyl group, and $R_4$ represents an alkyl group having 3 to 16 carbon atoms.)

Examples of the compound of the formula (D) of (1-4) include butyl (meth) acrylate, 2-ethylhexyl (meth) acrylate, isodecyl (meth) acrylate, n-lauryl (meth) acrylate and tridecyl (meth) acrylate. Among them, 2-ethylhexyl (meth) acrylate is preferable in view of adhesiveness and moisture resistance.

In the formula (D), the alkyl group of $R_4$ has 3 to 16 carbon atoms, preferably 4 to 13 carbon atoms. When the number of carbon the alkyl group is less than 3, the moisture resistance may deteriorate. When the number of carbon the alkyl group is more than 16, the adhesiveness may deteriorate.

The polymerizable vinyl monomer of (1) comprises preferably 5 to 40 parts by mass, more preferably 7 to 35 parts by mass of the compound of General Formula (D) of (1-4) with respect to 100 parts by mass of the polymerizable vinyl monomer of (1). When the polymerizable vinyl monomer of (1) comprises less than 5 parts by mass of the compound of General Formula (D), the moisture resistance may deteriorate. When the polymerizable vinyl monomer of (1) comprises more than 40 parts by mass of the compound of General Formula (D), the tensile-shearing strength, especially against iron, may deteriorate.

As the polymerization initiator (2) used in the present embodiment, a thermal radical polymerization initiator is preferable. Among the thermal radical polymerization initiators, organic peroxides are preferred. Examples of the organic peroxide include cumene hydroperoxide, paramenthane hydroperoxide, tertiary butyl hydroperoxide, diisopropylbenzene dihydroperoxide, methyl ethyl ketone peroxide, benzoyl peroxide, tertiary butyl peroxybenzoate and the like. One or more of these can be used. Among them, cumene hydroperoxide is preferred from the viewpoint of reactivity.

The composition comprises preferably 0.5 to 10 parts by mass, more preferably 1 to 7 parts by mass of the polymerization initiator of (2) with respect to 100 parts by mass of the polymerizable vinyl monomer of (1). When the composition comprises less than 0.5 parts by mass of the polymerization initiator, the cure rate may decrease. When the composition comprises more than 10 parts by mass of the polymerization initiator, the storage stability may deteriorate.

In this embodiment, any known reducing agents which react with the polymerization initiator to generate radicals can be used as the reducing agent of (3). Typical examples of the reducing agents include, tertiary amine, thiourea derivative, transition metal salt.

Examples of the tertiary amine include triethylamine, tripropylamine, tributylamine and N, N-dimethylparatoluidine. Examples of the thiourea derivative include 2-mercaptobenzimidazole, methylthiourea, dibutylthiourea, tetramethylthiourea and ethylenethiourea. Examples of the transition metal salt include cobalt naphthenate, copper naphthenate and vanadyl acetylacetonate. Among them, from the viewpoint of reactivity, transition metal salt is preferable, and vanadyl acetylacetonate are more preferable.

The composition comprises preferably 0.01 to 5 parts by mass, more preferably 0.05 to 1 parts by mass of the reducing agent of (3) with respect to 100 parts by mass of the polymerizable vinyl monomer of (1). When the composition comprises less than 0.01 parts by mass of the reducing agent, the cure rate may decrease. When the composition comprises more than 5 parts by mass of the reducing agent, the storage stability may deteriorate.

In this embodiment, the composition comprises an elastomer having no polymerizable unsaturated double bond at the end and having 10 to 30 mol % of a (meth) acrylonitrile as (4).

Examples of the elastomer having no polymerizable unsaturated double bond at the end and having 10 to 30 mol % of a (meth) acrylonitrile of (4) include (meth) acrylonitrile-butadiene—(meth) acrylic acid copolymer, diene-based copolymer such as (meth) acrylonitrile-butadiene—methyl (meth) acrylate copolymer, (meth) acrylonitrile—butadiene copolymer, styrene—butadiene copolymer.

The elastomer having no polymerizable unsaturated double bond at the end and having 10 to 30 mol % of a (meth) acrylonitrile of (4) is preferably an elastomer soluble in the polymerizable vinyl monomer of (1).

Among them, the diene-based copolymer is preferable from the viewpoint of solubility and adhesiveness. Among the diene-based copolymers, (meth) acrylonitrile-butadiene—(meth) acrylic acid copolymer, and (meth) acrylonitrile—butadiene copolymer are preferable, and (meth) acrylonitrile—butadiene copolymer is more preferable.

The elastomer of (4) has preferably 10 to 30 mol %, more preferably 15 to 25 mol %, further preferably 13 to 20 mol % of the (meth) acrylonitrile from the viewpoint of peel strength at low temperature and impact resistance. When the elastomer of (4) has 10 mol % or more of the (meth) acrylonitrile, the effect of the present invention can be easily achieved, and when the elastomer of (4) has 30 mol % or less of the (meth) acrylonitrile, corrosion hardly occurs even when a metal such as copper is an object to be adhered.

The composition comprises preferably 5 to 35 parts by mass, more preferably 10 to 30 parts by mass, further preferably 15 to 20 parts by mass of the elastomer having no polymerizable unsaturated double bond at the end and having 10 to 30 mol % of a (meth) acrylonitrile of (4) with respect to 100 parts by mass of the polymerizable vinyl monomer of (1). When the composition comprises less than 5 parts by mass of the elastomer, the peel strength at low temperature and impact resistance may be not enough. When the composition comprises more than 35 parts by mass of the elastomer, the curability may be insufficient by viscosity increasing and workability deteriorating.

The composition of the present embodiment may comprise various paraffins to promote curing a part in contact with air. Examples of the paraffins include paraffin, microcrystalline wax, carnauba wax, bees wax, lanolin, spermaceti, ceresin and candelilla wax and the like. Among them, paraffin is preferred. The melting point of paraffins is preferably 40 to 100° C.

The composition comprises preferably 0.1 to 5 parts by mass of the paraffins with respect to 100 parts by mass of the polymerizable vinyl monomer of (1). When the composition comprises less than 0.1 parts by mass of the paraffins, the curability may deteriorate. When the composition comprises more than 5 parts by mass of the paraffins, the adhesion strength may deteriorate.

In order to improve the storage stability, the composition may further comprise various antioxidants including a polymerization inhibitor and the like.

In order to improve the adhesiveness and enhance the cure rate, the composition may further comprise phosphate.

Moreover, the composition may comprise known substances such as a plasticizer, a filler, a coloring agent and a rust preventive agent.

Although the components used in this embodiment have been described above, even when the composition may further comprise compounds with a low odor other than (1-1), (1-2), (1-3) and (1-4).

In an embodiment of the present invention, it is preferred that the composition is used as an adhesive composition. For example, the composition may be used as a two-component adhesive composition. A first agent and a second agent comprising the two-component adhesive composition are separately stored, the first agent and the second agent are not mixed during storage. The first agent comprises at least the polymerization initiator of (2). The second agent comprises at least the reducing agent of (3). The two agents can be used as the two-component adhesive composition by coating and curing both materials simultaneously or separately.

In another embodiment, the composition also may be used as a single-component adhesive composition by mixing two agents at curing, the two agent comprises the first agent and the second agent wherein the polymerizable vinyl monomer and other optional components may be previously contained in either or both of the first agent and the second agent.

Among these embodiments, from the viewpoint of excellent storage stability, it is preferable to use the composition as a two-component adhesive composition.

In the present invention, a joined body is produced by bonding adherends with a cured product of a curable resin composition including the composition mentioned above. The adherend, it is not limited, but may be made of various materials, such as paper, wood, ceramic, glass, ceramics, rubber, plastic, mortar, concrete and metal. The material is preferably metal, since when the adherend is made of metal, especially iron and stainless steel the adhesiveness is improved.

Second Embodiment

In an embodiment of the present invention, a composition comprising components of (1) to (5): (1) a polymerizable vinyl monomer comprising (1-1) to (1-4); (2) a polymerization initiator; (3) a reducing agent; (4) an elastomer having a polymerizable unsaturated double bond at the end and having 10 to 30 mol % of a (meth) acrylonitrile; and (5) an elastomer having no polymerizable unsaturated double bond at the end, wherein (1-1) a compound represented by a General formula (A);

[General Formula (A)]

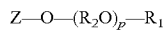

$Z-O-(R_2O)_p-R_1$ (In the formula (A), Z represents a (meth) acryloyl group, and $R_1$ represents a phenyl group or a phenyl group having an alkyl group having 1 to 3 carbon atoms. $R_2$ represents —$C_2H_4$—, —$C_3H_6$—, —$CH_2CH(CH_3)$—, —$C_4H_8$— or —$C_6H_{12}$—, and p represents an integer of 1 to 10.)

(1-2) a compound represented by a General Formula (B);

[General Formula (B)]

$Z-O-(R_2O)_p-H$ (In the formula (B), Z, $R_2$ and p are as defined above.)

(1-3) a compound represented by a General Formula (C); and

[General Formula (C)]

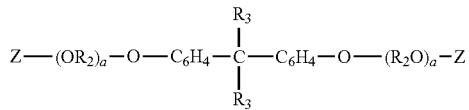

$$Z-(OR_2)_a-O-C_6H_4-\underset{\underset{R_3}{|}}{\overset{\overset{R_3}{|}}{C}}-C_6H_4-O-(R_2O)_a-Z$$

(In the formula (C), Z represents a (meth) acryloyl group, and $R_2$ represents —$C_2H_4$—, —$C_3H_6$—, —$CH_2CH(CH_3)$—, —$C_4H_8$— or —$C_6H_{12}$—. $R_3$ represents hydrogen or an alkyl group having 1 to 4 carbon atoms, and q represents a number of 0 or more.)

(1-4) a compound represented by a General Formula (D)

[General Formula (D)]

$Z-O-R_4$ (In the formula (D), Z represents a (meth) acryloyl group, and $R_4$ represents an alkyl group having 3 to 16 carbon atoms.).

The details of the polymerizable vinyl monomer (1-1) to (1-4) of (1), the polymerization initiator of (2), the reducing agent of (3), the paraffins in this embodiment (examples, amounts, etc.) is as described in the first embodiment.

In this embodiment, the composition comprises an elastomer having a polymerizable unsaturated double bond at the end and having 10 to 30 mol % of a (meth) acrylonitrile as (4). The elastomer is rubber, in particular, a compound having a polymerizable unsaturated double bond at the end of the molecular chain of the rubber component. The elastomer of (4) preferably has polymerizable unsaturated double bonds at both ends of the molecular chain of the rubber component.

As the polymerizable unsaturated double bond, from the viewpoint of good reactivity, a (meth) acryloyl group and/or a vinyl group is preferable, and a (meth) acryloyl group is more preferable.

As the rubber component, a diene-based (co) polymer is preferable. Examples of the diene-based (co) polymer include butadiene—(meth) acrylonitrile rubber, (meth) acrylonitrile-butadiene—(meth) acrylic acid rubber and the like. Among diene-based (co) polymers, butadiene—(meth) acrylonitrile rubber is preferable, butadiene-acrylonitrile rubber is more preferable from the viewpoint of good flexibility and good compatibility with the above-mentioned monomers.

The elastomer of (4) has preferably 10 to 30 mol %, more preferably 15 to 25 mol %, further preferably 13 to 20 mol % of the (meth) acrylonitrile from the viewpoint of peel strength at low temperature and impact resistance. When the elastomer of (4) has 10 mol % or more of the (meth) acrylonitrile, the effect of the present invention can be easily obtained, and when the elastomer of (4) has 30 mol % or less of the (meth) acrylonitrile, corrosion hardly occurs even when a metal such as copper is an object to be adhered.

As a method for introducing polymerizable unsaturated double bonds into both ends of the molecular chain of the above rubber component, an example method is a method of introducing a carboxyl group into both ends of the rubber component and reacting the carboxyl group with glycidyl (meth) acrylate. Another example is a method of dehydrating the carboxyl group and hydroxy (meth) acrylate. Moreover, another example is a method of reacting diisocyanate and hydroxy (meth) acrylate and further reacting the product with a liquid rubber having a reactive hydroxyl group at the end.

Among rubbers by these methods, the rubber obtained by the method of introducing a carboxyl group into both ends of the molecular chain of the rubber component and reacting the carboxyl group with glycidyl (meth) acrylate is preferred. An exemplary rubber obtained by the method of introducing a carboxyl group into both ends of the molecular chain of the rubber component and reacting the carboxyl group with glycidyl (meth) acrylate is "Hypro 1300×33 LC VTBNX" available from An Emerald Performance Material.

The rubber having a polymerizable unsaturated double bond at the end and having 10 to 30 mol % of a (meth) acrylonitrile of (4) is preferably a liquid rubber. Herein, "liquid rubber" means a rubber which is liquid at normal temperature (23° C.).

The number average molecular weight of the rubber having a polymerizable unsaturated double bond at the end and having 10 to 30 mol % of a (meth) acrylonitrile of (4) is preferably 1,000 to 1,000,000, more preferably 2,000 to 500,000. When the number average molecular weight of the rubber is less than 1000, the peel strength at low temperature may deteriorate, and when the number average molecular weight of the rubber is more than 1,000,000 the fluidity may be lost.

In the examples of the present invention, a number-average molecular weight in terms of polystyrene measured by GPC (gel permeation chromatography) was used. Specifically, the average molecular weight was determined under the following conditions using a calibration curve prepared with commercially available standard polystyrene, GPC system (SC-8010 manufactured by Tosoh Corporation), and tetrahydrofuran as a solvent.

Flow rate: 1.0 ml/min
Setting temperature: 40° C.
Column: 3 columns (total number of theoretical plates: 32,000) including one column of "TSK guardcolumn MP (xL)" 6.0 mm ID×4.0 cm (manufactured by Tosoh Corporation), and 2 columns of "TSK-GELMULTIPORE-HXL-M" 7.8 mm ID×30.0 cm (number of theoretical plates: 16,000 stages) (manufactured by Tosoh Corporation)
Sample injection volume: 100 μl (concentration of sample solution: 1 mg/ml)
Feeding pressure: 39 kg/cm$^2$
Detector: RI detector The composition comprises preferably 1 to 50 parts by mass, more preferably 5 to 30 parts by mass, further preferably 10 to 20 parts by mass of the rubber having a polymerizable unsaturated double bond at the end and having 10 to 30 mol % of a (meth) acrylonitrile of (4) with respect to 100 parts by mass of the polymerizable vinyl monomer of (1). When the composition comprises less than 1 parts by mass of the rubber, the peel strength at low temperature and impact resistance may be not enough. When the composition comprises more than 50 parts by mass of the rubber, the curability may be insufficient by viscosity increasing and workability deteriorating.

In this embodiment, the composition comprises an elastomer having no polymerizable unsaturated double bond at the end.

Examples of the elastomer having no polymerizable unsaturated double bond at the end of (5) include diene copolymers such as (meth) acrylonitrile-butadiene—(meth) acrylic acid copolymer, (meth) acrylonitrile-butadiene-methyl (meth) acrylate copolymer, (meth) acrylonitrile-butadiene copolymer and styrene-butadiene copolymer, styrene thermoplastic elastomers such as chlorosulfonated polyethylene and styrene-polybutadiene-styrene synthetic rubber, urethane elastomers. The elastomer having no polymerizable unsaturated double bond at the end of (5) is preferably an elastomer soluble in the polymerizable vinyl monomer of (1).

Among them, the diene-based copolymer is preferable from the viewpoint of solubility and adhesiveness. Among the diene-based copolymers, (meth) acrylonitrile-butadiene—(meth) acrylic acid copolymer, and (meth) acrylonitrile—butadiene copolymer are preferable, and (meth) acrylonitrile—butadiene copolymer is more preferable.

The elastomer having no polymerizable unsaturated double bond at the end of (5) preferably has a (meth) acrylonitrile structure. If the elastomer of (5) has the (meth) acrylonitrile structure, the elastomer of (5) has preferably 10 to 30 mol %, more preferably 15 to 25 mol %, further preferably 13 to 20 mol % of the (meth) acrylonitrile from the viewpoint of peel strength at low temperature and impact resistance. When the elastomer of (5) has 10 mol % or more of the (meth) acrylonitrile, the effect of the present invention can be easily achieved, and when the elastomer of (5) has 30 mol % or less of the (meth) acrylonitrile, corrosion hardly occurs even when a metal such as copper is an object to be adhered.

The composition comprises preferably 5 to 35 parts by mass, more preferably 7 to 33 parts by mass, further preferably 10 to 30 parts by mass of the elastomer having no polymerizable unsaturated double bond at the end of (5) with respect to 100 parts by mass of the polymerizable vinyl monomer of (1).

If the composition comprises the rubber having a polymerizable unsaturated double bond at the end and having 10 to 30 mol % of a (meth) acrylonitrile of (4) and the elastomer having no polymerizable unsaturated double bond at the end of (5), a content ratio of the elastomer of (4) and the elastomer of (5) is preferably (4): (5)=10 to 90:90 to 10, more preferably (4): (5)=30 to 70:70 to 30, further preferably (4): (5)=40 to 60:60 to 40 parts by mass when a total amount of (4) and (5) is 100 parts by mass.

In order to improve the storage stability, the composition may further comprise various antioxidants including a polymerization inhibitor and the like.

In order to improve the adhesiveness and enhance the cure rate, the composition may further comprise phosphate.

Moreover, the composition may comprise known substances such as a plasticizer, a filler, a coloring agent and a rust preventive agent.

Although the components used in this embodiment have been described above, even when the composition may further comprise compounds with a low odor other than (1-1), (1-2), (1-3) and (1-4).

In an embodiment of the present invention, it is preferred that the composition is used as an adhesive composition. For example, the composition may be used as a two-component adhesive composition. A first agent and a second agent comprising the two-component adhesive composition are separately stored, the first agent and the second agent are not mixed during storage. The first agent comprises at least the polymerization initiator of (2). The second agent comprises at least the reducing agent of (3). The two agents can be used as the two-component adhesive composition by coating and curing both materials simultaneously or separately.

In another embodiment, the composition also may be used as a single-component adhesive composition by mixing two agents at curing, the two agent comprises the first agent and the second agent wherein the polymerizable vinyl monomer and other optional components may be previously contained in either or both of the first agent and the second agent.

Among these embodiments, from the viewpoint of excellent storage stability, it is preferable to use the composition as a two-component adhesive composition.

In the present invention, a joined body is produced by bonding adherends with a cured product of a curable resin composition including the composition mentioned above. The adherend, it is not limited, but may be made of various materials, such as paper, wood, ceramic, glass, ceramics, rubber, plastic, mortar, concrete and metal. The material is preferably metal, since when the adherend is made of metal, especially iron and stainless steel the adhesiveness is improved.

EXAMPLE

The present invention will be explained in more detail by the following experimental examples.

Experimental Example A

Adhesive compositions having as shown in Table 1 were prepared and various physical properties were measured. The results are shown in Table 1. Unit of usage of each substance is shown in parts by mass. For each substance, 2,2-bis (4-methacryloxypolyethoxyphenyl) propane which q=5 is used, paraffin having a melting point of 40 to 100° C. is used as paraffins, various physical properties were measured as follows.

For each substance listed in the table, the following abbreviations are used. Acrylonitrile-butadiene rubber: Acrylonitrile-butadiene copolymer having no polymerizable unsaturated double bond at the end AN amount: Acrylonitrile content (mol %) contained in acrylonitrile-butadiene rubber

[Tensile Shear Strength (Tensile Shear Bond Strength)]

As a specimen, a steel plate of SPCC-D having a size of 100×25×1.6 mm treated with a rag was used. Under conditions of a temperature of 23° C. and a humidity of 50%, in accordance with JIS K-6850, the first agent was applied to one side of the specimen and the second agent was applied to one side of another specimen. Immediately thereafter, the applied surfaces were put together and bonded. After that, the bonded specimens were cured for 24 hours at room temperature and were used as a sample for measuring tensile shear strength. The tensile shear strength (unit: MPa) of the sample was measured under conditions of a temperature of 23° C. and a humidity of 50% at a pulling rate of 10 mm/min.

[Peeling Strength (Peel Adhesion Strength)]

As a specimen, a steel plate of SPCC-D having a size of 100×25×1.6 mm treated with a rag and a steel plate of SUS 304 having a size of 200×25×1.5 mm treated with a rag were used. Under conditions of a temperature of 23° C. and a humidity of 50%, in accordance with JIS K-6854, the first agent was applied to one side of the specimen and the second agent was applied to one side of another specimen. Immediately thereafter, the applied surfaces were put together and bonded. After that, the bonded specimens were cured for 24 hours at room temperature and were used as a sample for measuring T peeling strength. To test the low temperature characteristic, T peel strength at a tensile rate of 50 mm/min under conditions of a temperature of −20° C. was compared with T peel strength at a tensile rate of 50 mm/min under conditions of a temperature of 23° C. and a humidity of 50%. Breakage distance of peeling at −20° C. was also compared.

The breaking distance of peeling was measured by the following method. Using the sample for measuring T peel strength, the distance between the chucks was set to 1 cm, the upper end and the lower end of the above specimen were fixed, and the specimens were moved up and down at a rate of 50 mm/min at −20° C. and a tensile distance leading to breakage were measured. The larger the breaking distance, the greater the peel strength.

[Impact Resistance Test]

As a specimen, a panel of SUS 304 having a size of 2000×500×1.5 mm treated with a rag and a reinforcement of SPCC-D having a size of 1800×20×1.5 mm treated with a rag were used. Under conditions of a temperature of 23° C. and a humidity of 50%, in accordance with JIS K-6854, the first agent was applied to one side of the specimen and the second agent was applied to one side of another specimen. Immediately thereafter, the applied surfaces were put together and bonded. After that, the bonded specimens were cured for 24 hours at room temperature and were used as a sample for the impact resistance test. In the impact resistance test, the panel with the reinforcement on the back was leveled and both ends were supported and fixed. An iron ball of 45 kg was hung at a height of 800 mm from the panel surface and 1000 mm from the end of the panel. The iron ball was let to naturally fell to impact the panel and the panel was shocked. It was observed whether the reinforcement on the back side peeled off from the panel.

Peeling rate of reinforcement (%)=(area where reinforcement peeled off)/(area where adhesive was applied to)×100(%)

[Odor]

The intensity of odor of each curable resin composition was estimated as follows.

Using a resin composition, a cured product having a diameter of 10 mm and a thickness of 1 mm was prepared, put the cured product in a glass bottle, the bottle was sealed tightly, left for 1 hour, and then the odor was measured using an odor sensor (manufactured by CALMOR). The measured value of odor in the tested room was 360. The larger the numerical value, the stronger the odor. The odor value is preferably 1000 or less, more preferably 600 or less, further preferably 500 or less.

TABLE 1

| | | Experiment | | | |
|---|---|---|---|---|---|
| Experiment No | | 1 | 2 | 3 | 4 |
| First Agent | (1-1) Phenoxyethyl methacrylate | 0 | 40 | 40 | 40 |
| | (1-2) 2-hydroxyethyl methacrylate | 40 | 40 | 40 | 40 |
| | (1-3) 2,2-bis (4-methacryloxypolyethoxyphenyl) propane | 0 | 10 | 10 | 10 |
| | (1-4) 2-ethylhexyl methacrylate | 20 | 10 | 10 | 10 |
| | (2) Cumene hydroxyperoxide | 4 | 4 | 4 | 4 |
| | (4) Acrylonitrile-butadiene rubber (AN amount: 15%) | 0 | 0 | 0 | 0 |
| | (4) Acrylonitrile-butadiene rubber (AN amount: 19.5%) | 0 | 0 | 0 | 10 |
| | Paraffin | 1 | 1 | 1 | 1 |
| | Methyl methacrylate | 40 | 0 | 0 | 0 |
| | Butadiene rubber | 0 | 0 | 10 | 0 |
| | Acrylonitrile-butadiene rubber (AN amount: 35%) | 10 | 10 | 0 | 0 |
| Second Agent | (1-1) Phenoxyethyl methacrylate | 0 | 40 | 40 | 40 |
| | (1-2) 2-hydroxyethyl methacrylate | 40 | 40 | 40 | 40 |
| | (1-3) 2,2-bis (4-methacryloxypolyethoxyphenyl) propane | 0 | 10 | 10 | 10 |
| | (1-4) 2-ethylhexyl methacrylate | 20 | 10 | 10 | 10 |
| | (3) Vanadyl acetylacetonate | 0.5 | 0.5 | 0.5 | 0.5 |
| | (4) Acrylonitrile-butadiene rubber (AN amount: 15%) | 0 | 0 | 0 | 0 |
| | (4) Acrylonitrile-butadiene rubber (AN amount: 19.5%) | 0 | 0 | 0 | 10 |
| | Paraffin | 1 | 1 | 1 | 1 |
| | Methyl methacrylate | 40 | 0 | 0 | 0 |
| | Butadiene rubber | 0 | 0 | 10 | 0 |
| | Acrylonitrile-butadiene rubber (AN amount: 35%) | 10 | 10 | 0 | 0 |

TABLE 1-continued

| Evaluation | Tensile Shear Bond Strength [MPa] | 22 | 22 | Rubber not dissolved | 23 |
|---|---|---|---|---|---|
| | Peel Adhesion Strength at 23° C. [kN/m] | 7.0 | 5.0 | | 6.0 |
| | Peel Adhesion Strength at −20° C. [kN/m] | 6.0 | not measurable | (not measurable) | 4.0 |
| | Breaking Distance of Peeling at −20° C. [mm] | ≥180 | 10 | | 150 |
| | Impact Resistance Test (Peeling rate of reinforcement) [%] | 0 | 100 | | 0 |
| | Odor | 3000 | 560 | 560 | 550 |
| | Note | Comparative Example | Comparative Example | Comparative Example | Example |

| | | Experiment | | | |
|---|---|---|---|---|---|
| | Experiment No | 5 | 6 | 7 | 8 |
| First Agent | (1-1) Phenoxyethyl methacrylate | 40 | 40 | 40 | 40 |
| | (1-2) 2-hydroxyethyl methacrylate | 40 | 40 | 40 | 40 |
| | (1-3) 2,2-bis (4-methacryloxypolyethoxyphenyl) propane | 10 | 10 | 10 | 10 |
| | (1-4) 2-ethylhexyl methacrylate | 10 | 10 | 10 | 10 |
| | (2) Cumene hydroxyperoxide | 4 | 4 | 4 | 4 |
| | (4) Acrylonitrile-butadiene rubber (AN amount: 15%) | 0 | 0 | 10 | 15 |
| | (4) Acrylonitrile-butadiene rubber (AN amount: 19.5%) | 15 | 20 | 0 | 0 |
| | Paraffin | 1 | 1 | 1 | 1 |
| | Methyl methacrylate | 0 | 0 | 0 | 0 |
| | Butadiene rubber | 0 | 0 | 0 | 0 |
| | Acrylonitrile-butadiene rubber (AN amount: 35%) | 0 | 0 | 0 | 0 |
| Second Agent | (1-1) Phenoxyethyl methacrylate | 40 | 40 | 40 | 40 |
| | (1-2) 2-hydroxyethyl methacrylate | 40 | 40 | 40 | 40 |
| | (1-3) 2,2-bis (4-methacryloxypolyethoxyphenyl) propane | 10 | 10 | 10 | 10 |
| | (1-4) 2-ethylhexyl methacrylate | 10 | 10 | 10 | 10 |
| | (3) Vanadyl acetylacetonate | 0.5 | 0.5 | 0.5 | 0.5 |
| | (4) Acrylonitrile-butadiene rubber (AN amount: 15%) | 0 | 0 | 10 | 15 |
| | (4) Acrylonitrile-butadiene rubber (AN amount: 19.5%) | 15 | 20 | 0 | 0 |
| | Paraffin | 1 | 1 | 1 | 1 |
| | Methyl methacrylate | 0 | 0 | 0 | 0 |
| | Butadiene rubber | 0 | 0 | 0 | 0 |
| | Acrylonitrile-butadiene rubber (AN amount: 35%) | 0 | 0 | 0 | 0 |
| Evaluation | Tensile Shear Bond Strength [MPa] | 22 | 22 | 22 | 21 |
| | Peel Adhesion Strength at 23° C. [kN/m] | 7.5 | 8.5 | 6.3 | 7.8 |
| | Peel Adhesion Strength at −20° C. [kN/m] | 7.0 | 8.0 | 4.5 | 7.5 |
| | Breaking Distance of Peeling at −20° C. [mm] | ≥180 | ≥180 | ≥180 | ≥180 |
| | Impact Resistance Test (Peeling rate of reinforcement) [%] | 0 | 0 | 0 | 0 |
| | Odor | 500 | 480 | 550 | 540 |
| | Note | Example | Example | Example | Example |

Unit of composition is parts by mass.

From Table 1, the following is found. In the present invention, since the elastomer (4) is used, the peel strength at low temperature was high and the impact resistance was high. In Experiment 6, since a content of (meth) acrylate comprising (1-1) to (1-4) was less while a content of the elastomer (4) was large, low odor and low volatility could be achieved. In Experiment 3 using the butadiene rubber having no acrylonitrile, the butadiene rubber did not dissolve and could not be evaluated. In Experiment 2 using the rubber having a large acrylonitrile content, the peel strength at low temperature was low and the impact resistance was low. In Experiment 1 using methyl methacrylate instead of (1-1) and (1-3), odor was strong and the effect of the present invention was not provided.

Experimental Example B

Adhesive compositions having as shown in Table 2 were prepared and various physical properties were measured. The results are shown in Table 2. Unit of usage of each substance is shown in parts by mass. For each substance, 2,2-bis (4-methacryloxypolyethoxyphenyl) propane which q=5 is used, paraffin having a melting point of 40 to 100° C. is used as paraffins, various physical properties were measured as Experimental Example A.

TABLE 2

| | | Experiment | | | | | |
|---|---|---|---|---|---|---|---|
| | Experiment No | 9 | 10 | 11 | 12 | 13 | 14 |
| First Agent | (1-1) Phenoxyethyl methacrylate | 0 | 40 | 40 | 40 | 40 | 40 |
| | (1-2) 2-hydroxyethyl methacrylate | 40 | 40 | 40 | 40 | 40 | 40 |
| | (1-3) 2,2-bis (4-methacryloxypolyethoxyphenyl) propane | 0 | 10 | 10 | 10 | 10 | 10 |
| | (1-4) 2-ethylhexyl methacrylate | 20 | 10 | 10 | 10 | 10 | 10 |
| | (2) Cumene hydroxyperoxide | 4 | 4 | 4 | 4 | 4 | 4 |
| | (4) Liquid NBR (AN amount: 18%) | 0 | 10 | 0 | 5 | 10 | 30 |
| | (5) NBR (AN amount: 35%) | 10 | 10 | 0 | 0 | 0 | 0 |
| | (5) NBR (AN amount: 19.5%) | 0 | 0 | 10 | 10 | 10 | 10 |

TABLE 2-continued

|  |  | Experiment | | | | | |
| --- | --- | --- | --- | --- | --- | --- | --- |
| Experiment No | | 9 | 10 | 11 | 12 | 13 | 14 |
| | Paraffin | 1 | 1 | 1 | 1 | 1 | 1 |
| | Methyl methacrylate | 40 | 0 | 0 | 0 | 0 | 0 |
| Second Agent | (1-1) Phenoxyethyl methacrylate | 0 | 40 | 40 | 40 | 40 | 40 |
| | (1-2) 2-hydroxyethyl methacrylate | 40 | 40 | 40 | 40 | 40 | 40 |
| | (1-3) 2,2-bis (4-methacryloxypolyethoxyphenyl) propane | 0 | 10 | 10 | 10 | 10 | 10 |
| | (1-4) 2-ethylhexyl methacrylate | 20 | 10 | 10 | 10 | 10 | 10 |
| | (3) Vanadyl acetylacetonate | 0.5 | 0.5 | 0.5 | 0.5 | 0.5 | 0.5 |
| | (4) Liquid NBR (AN amount: 18%) | 0 | 10 | 0 | 5 | 10 | 30 |
| | (5) NBR (AN amount: 35%) | 10 | 10 | 0 | 0 | 0 | 0 |
| | (5) NBR (AN amount: 19.5%) | 0 | 0 | 10 | 10 | 10 | 10 |
| | Paraffin | 1 | 1 | 1 | 1 | 1 | 1 |
| | Methyl methacrylate | 40 | 0 | 0 | 0 | 0 | 0 |
| Evaluation | Tensile Shear Bond Strength [MPa] | 22 | 25 | 20 | 22 | 22 | 21 |
| | Peel Adhesion Strength at 23° C. [kN/m] | 7.0 | 6.3 | 4.3 | 5.0 | 5.7 | 6.2 |
| | Peel Adhesion Strength at −20° C. [kN/m] | 6.0 | not measurable | 2.6 | 5.0 | 7.7 | 9.3 |
| | Breaking Distance of Peeling at −20° C. [mm] | ≥180 | 10 | 150 | ≥180 | ≥180 | ≥180 |
| | Impact Resistance Test (Peeling rate of reinforcement) [%] | 0 | 100 | 0 | 0 | 0 | 0 |
| | Odor | 3000 | 540 | 560 | 530 | 500 | 480 |
| | Note | Comparative Example | Example | Comparative Example | Example | Example | Example |

Unit of composition is parts by mass.

For each substance listed in the table, the following abbreviations are used.

Liquid NBR: Liquid acrylonitrile rubber having a polymerizable unsaturated double bond at the end (Hypro 1300× 33 LC VTBNX available from An Emerald Performance Material, liquid, number-average molecular weight: 3900)

NBR: Acrylonitrile-butadiene copolymer, elastomer having no polymerizable unsaturated double bond at the end (commercially available)

AN amount: Acrylonitrile content (mol %) contained in Liquid NBR having a polymerizable unsaturated double bond at the end or acrylonitrile-butadiene rubber From Table 2, the following is found. In the present invention, as the amount of the elastomer (4) more, the peel strength at low temperature higher and the impact resistance higher. In Experiment 14, since the content of (meth) acrylate of (1-1) to (1-4) was less while (4) and (5) were more, the low odor and low volatility were achieved. In Experiment 10, since (4) was contained, the peeling strength was higher than that of Experiment 11. However, in Experiment 10, since the acrylonitrile content of (5) was large, the impact resistance was low. In Experiment 9 using methyl methacrylate instead of (1-1) and (1-3), odor was strong and the effect of the present invention was not provided.

INDUSTRIAL APPLICABILITY

By using the adhesive composition of the present invention, a two-component (meth) acrylic adhesive composition having low odor and high peel strength at low temperature can be provided. Therefore, it is possible to obtain an adhesive which can be used by working even in places where ventilation is insufficient, and an adhesive whose cured product does not peel off even in cold areas. That is, an adhesive that can be adapted to a wide range of environments can be obtained. Furthermore, since it is possible to provide a two-component (meth) acrylic adhesive which can withstand a strong impact, it can be applied not only to improvement of work environment but also to various industrial fields.

The invention claimed is:

1. A composition comprising components of (1) to (5):
(1) a polymerizable vinyl monomer comprising (1-1) to (1-4);
(2) a polymerization initiator;
(3) a reducing agent;
(4) an elastomer having a polymerizabie unsaturated double bond at the end and having 10 to 30 mol % of a (meth) acrylonitrile; and
(5) an elastomer having no polymerizable unsaturated double bond at the end, wherein
(1-1) a compound represented by a General formula (A);

$$Z-O-(R_2O)_p-R_1 \qquad \text{[General Formula (A)]}$$

wherein in formula (A), Z represents a (meth) acryloyl group; $R_1$ represents a phenyl group or a phenyl group having an alkyl group having 1 to 3 carbon atoms; $R_2$ represents $-C_2H_4-$, $-C_3H_6-$, $-CH_2CH(CH_3)-$, $-C_4H_8-$ or $-C_6H_{12}-$; and p represents an integer of 1 to 10

(1-2) a compound represented by a General Formula (B);

$$Z-O-(R_2O)_p-H \qquad \text{[General Formula (B)]}$$

wherein in formula (B), Z, $R_2$ and p are as defined above (1-3) a compound represented by a General Formula (C); and

[General Formula (C)]

$$Z-(OR_2)_a-O-C_6H_4-\underset{\underset{R_3}{|}}{\overset{\overset{R_3}{|}}{C}}-C_6H_4-O-(R_2O)_a-Z$$

wherein in formula (C), Z represents a (meth) acryloyl group; $R_2$ represents $-C_2H_6-$, $-C_3H_6-$, $-CH_2CH(CH_3)-$, $-C_4H_8-$ or $-C_6H_{12}-$; $R_3$ represents hydrogen or an alkyl group having 1 to 4 carbon atoms; and g represents a number of 0 or more (1-4) a compound represented by a General Formula (0)

$$Z-O-R_4 \quad \text{[General Formula (D)]}$$

wherein in formula (D), Z represents a (meth) acryloyl group, and $R_4$ represents an alkyl group having 3 to 16 carbon atoms.

2. The composition of claim 1, wherein the elastomer of (5) has 10 to 30 mol % of a (meth) acrylonitrile.

3. The composition of claim 1, wherein the elastomer (5) is a diene copolymer.

4. The composition of claim 1, wherein a content ratio of the elastomer of (4) and the elastomer of (5) is (4):(5)=10 to 90:90 to 10 parts by mass when a total amount of (4) and (5) is 100 parts by mass.

5. The composition of claim 1, wherein
the composition comprises 1 to 50 parts by mass of the elastomer of (4) with respect to 100 parts by mass of the polymerizable vinyl monomer of (1), and
the composition comprises 5 to 35 parts by mass of the elastomer of (5) with respect to 100 parts by mass of the polymerizable vinyl monomer of (1).

6. The composition of claim 1, wherein
the polymerizable vinyl monomer of (1) comprises:
10 to 60 parts by mass of the compound of General Formula (A) of (1-1) with respect to 100 parts by mass of the polymerizable vinyl monomer of (1);
10 to 70 parts by mass of the compound of General Formula (B) of (1-2) with respect to 100 parts by mass of the polymerizable vinyl monomer of (1); and
1 to 30 parts by mass of the compound of General Formula (C) of (1-3) with respect to 100 parts by mass of the polymerizable vinyl monomer of (1); and
5 to 40 parts by mass of the compound of General Formula (D) of (1-4) with respect to 100 parts by mass of the polymerizable vinyl monomer of (1),
the composition comprises 1 to 50 parts by mass of the elastomer of (4) with respect to 100 parts by mass of the polymerizable vinyl monomer of (1), and
the composition comprises 5 to 35 parts by mass of the elastomer of (5) with respect to 100 parts by mass of the polymerizable vinyl monomer of (1).

7. The composition of claim 1, wherein the composition further comprises a paraffin.

8. The composition of claim 1, wherein the composition is a two-component composition comprising a first agent and a second agent, the first agent comprises at least the polymerization initiator of (2) and the second agent comprises at least the reducing agent of (3).

9. A curable resin composition comprising the composite of claim 1.

10. An adhesive composition comprising the curable resin composition of claim 9.

11. A joined body which adherends are bonded with the adhesive composition of claim 10.

* * * * *